United States Patent [19]

Mizoguchi

[11] Patent Number: 4,644,790

[45] Date of Patent: Feb. 24, 1987

[54] LIQUID LEVEL INDICATOR FOR HUMIDIFIER

[75] Inventor: Saburo Mizoguchi, Osaka, Japan

[73] Assignee: Sharp Kabushiki Kaisha, Osaka, Japan

[21] Appl. No.: 718,232

[22] Filed: Apr. 1, 1985

[51] Int. Cl.⁴ ............................................. G01F 23/02
[52] U.S. Cl. ................................... 73/293; 261/119.1
[58] Field of Search ............... 73/293, 323, 325, 327, 73/334, 427; 250/577; 261/DIG. 48, 81; 126/113

[56] References Cited

U.S. PATENT DOCUMENTS

| | | | |
|---|---|---|---|
| 2,596,897 | 5/1952 | Haatvedt | 73/293 |
| 3,242,794 | 3/1966 | Crane | 73/293 |
| 3,511,572 | 5/1970 | Peube et al. | 73/293 |
| 3,523,175 | 8/1970 | Gygax | 126/113 X |
| 3,713,338 | 1/1973 | Kind | 73/293 |
| 4,031,171 | 6/1977 | Asao et al. | 261/DIG. 48 |
| 4,303,601 | 12/1981 | Grimm et al. | 261/119 R X |
| 4,450,722 | 5/1984 | Keyes, IV et al. | 73/293 |

Primary Examiner—Daniel M. Yasich
Attorney, Agent, or Firm—Birch, Stewart, Kolasch & Birch

[57] ABSTRACT

A liquid level indicator comprising a liquid storing tank for storing liquid therein containing a first transparent portion and a second transparent portion; a mounting member of the liquid storing tank therein containing a third transparent portion and a fourth transparent portion; a non-transparent cover of the liquid storing tank within the mounting member; and a lamp for emitting light into the liquid tank through the fourth transparent portion of the mounting member and the second transparent portion of the liquid storing tank, the light being reflected at the surface of the liquid level to pass through the first transparent portion of the liquid storing tank and the third transparent portion of the mounting member whereby the level of the liquid can be noted from outside the liquid storing tank.

10 Claims, 4 Drawing Figures

LIQUID LEVEL INDICATOR FOR HUMIDIFIER

BACKGROUND OF THE INVENTION

The present invention relates to a liquid level indicator and, more particularly, to a liquid level indicator for use in a humidifier which exactly indicates the level of liquid amount in a liquid tank by applying light to the liquid in the liquid tank.

If a humidifier including the conventional liquid level indicator is used in a well-lighted room or in a direct light-source, light more than a necessary amount for indicating the level of the liquid may be applied to liquid in the liquid tank. Therefore, the function of the liquid level indicator is under the influence of a light amount of the surrounding. Accordingly, it is desired that an improved liquid level indicator for a humidifier which exactly indicates the amount of the liquid in the tank by applying low intensity light even with changing light.

SUMMARY OF THE INVENTION

Accordingly, it is an object of the present invention to provide an improved liquid level indicating device for use in a humidifier which exactly indicates a liquid level in the liquid tank by applying low intensity light without the influence of light from the surrounding.

It is another object of the present invention to provide an improved liquid level indicator which indicates a liquid level in a liquid tank and which can eliminate excess light, more than necessary, for indicating the level of the liquid amount.

It is still another object of the present invention to provide an improved liquid level indicator which enables a suitable liquid level indication without the influence of an external light source.

It is a further object of the present invention to provide an improved humidifier carrying a liquid tank in which a liquid level in the liquid tank can be indicated by applying light to the liquid in the liquid tank.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

To achieve the object, according to an embodiment of the present invention, a liquid level indicator comprises liquid storing tank means for storing liquid therein containing a first transparent portion and a second transparent portion, mounting means for detachably mounting the liquid storing tank means therein containing a third transparent portion and a fourth transparent portion, nontransparent covering means cooperating with the mounting means for covering the liquid storing tank means, and light source means for emitting light into the liquid tank means through the fourth transparent portion of the mounting means and the second transparent portion of the liquid storing tank means, wherein said light specifies the surface level of the liquid within the liquid tank means and said light can pass through the first transparent portion of the liquid storing tank means and the third transparent portion of the mounting means toward the outside.

The light being emitted from the light source means is reflected in the direction of the first transparent portion of the liquid storing tank means by an inclined surface of liquid produced by the surface tension of water. The first transparent portion of the liquid storing tank means is faced with the third transparent portion of the mounting means. The second transparent portion of the liquid storing tank means is faced with the fourth transparent portion of the mounting means.

According to another embodiment of the present invention, a liquid level indicator comprises a liquid storing tank means for storing liquid therein containing a first transparent portion and a second transparent portion, mounting means for detachably mounting the liquid storing tank means comprising a fourth transparent portion, covering means for covering the liquid storing tank means having a third transparent portion, and light source means for emitting light in the liquid tank means through the fourth transparent portion of the mounting means and the second transparent portion of the liquid storing tank means, wherein said light specifies the surface level of the liquid within the liquid tank means and said light can pass through the first transparent portion of the liquid storing tank means and the third transparent portion of the covering means toward the outside.

BRIEF DESCRIPTION OF THE DRAWINGS

The present invention will be better understood from the detailed description given hereinbelow and the accompanying drawings which are given by way of illustration only, and are not limitative of the present invention and wherein.

DETAILED DESCRIPTION OF THE INVENTION

Figure 1:
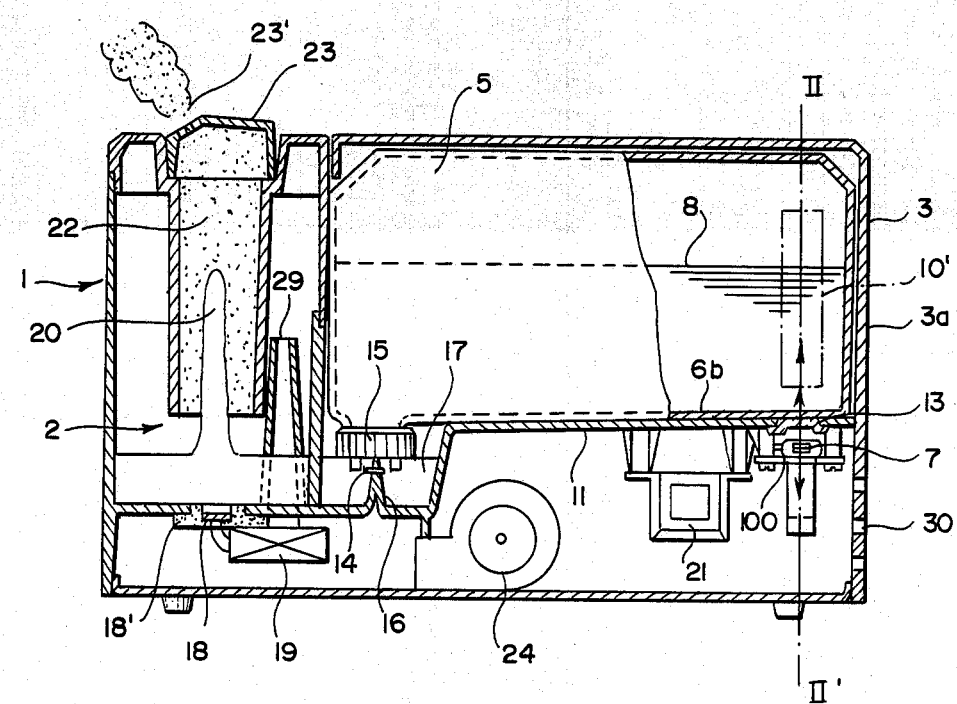
FIG. 1 shows a sectional view of a humidifier including a liquid level indicator according to a preferred embodiment of a present invention.
Figure 2:
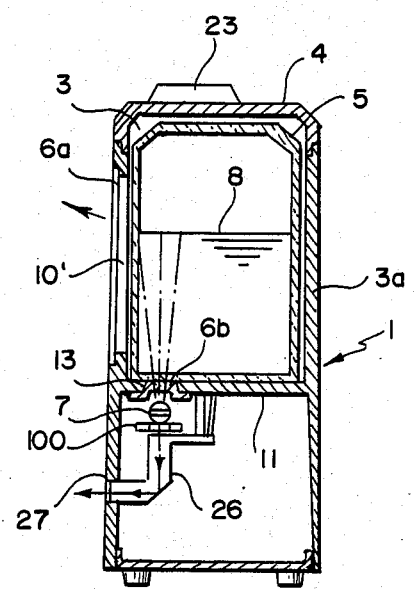
FIG. 2 shows a sectional view of the humidifier taken along line II—II' in FIG. 1.

A humidifier 1 including a liquid level indicator according to a preferred embodiment of the present invention will be described with reference to FIGS. 1 to 4.

The humidifier 1 comprises an atomizing chamber 2 provided at the left side of the humidifier 1 for atomizing water, and a water tank storing chamber or mounting means 3 provided at the right side of the humidifier 1 for storing a water tank 5. The water tank storing chamber 2 is formed in a box-like form, and has a housing or side wall 3a and a bottom wall 11 both made of a shield material such as a untransparent or non-translucent material so as to shield light from the surrounding. The housing wall 3a is integrally provided with the main body of the humidifier 1 and around the bottom wall 11 as the water tank seat plate. A cover 4 made of the shield material such as a non-transparent or translucent material is detached on the upper end of the housing wall 3a of the water tank storing chamber or mounting means 3. The water tank 5 for storing water therein is stored in the chamber formed by the bottom wall 11 and the housing wall 3a and is covered by the cover 4.

The cover 4 is detached from the water tank storing chamber or mounting means 3 when the water tank 5 is removed from the water tank storing chamber 3.

Figure 3:
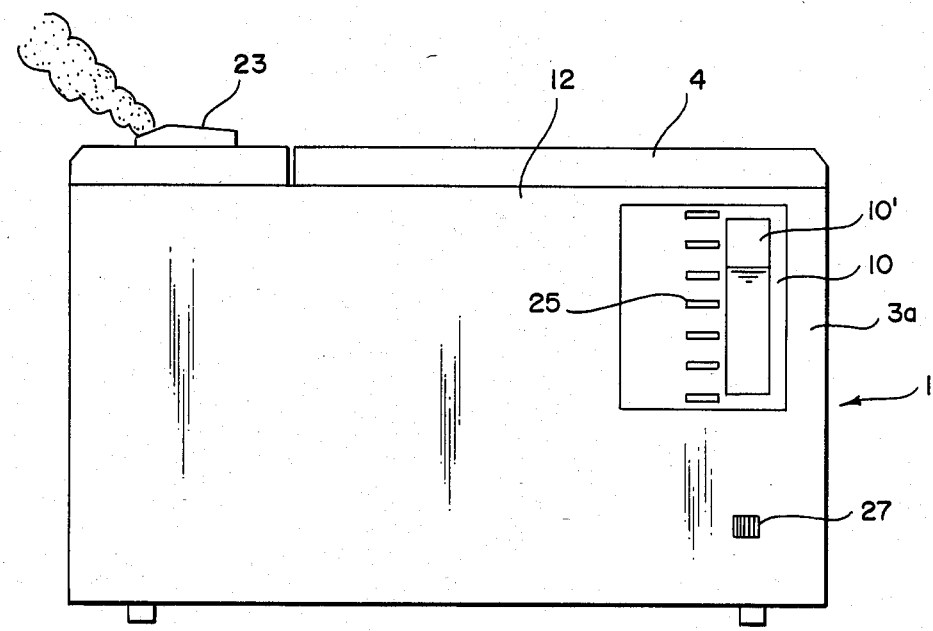
FIG. 3 shows a front view of the humidifier of FIG. 1.
Figure 4:
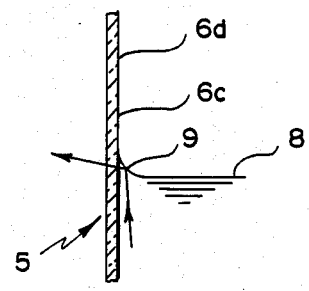
FIG. 4 shows a sectional view showing a side wall of a liquid tank carried on the humidifier of FIG. 1.

A transparent or translucent plate or fourth transparent portion 13 is provided with the bottom wall 11 of the water tank storing chamber or mounting means 3 for transmitting the light into the water tank 5 from a light source 7. The transparent plate or fourth transparent portion 13 is inserted into a hole formed in the bottom wall 11 of the water tank storing chamber 3. The transparent plate or fourth transparent portion 13 may be integrally provided with the bottom wall 11 so that a transparent area is formed at a suitable position on the bottom wall 11. A liquid level display area 10 is provided at a suitable position of a side wall 12 of the housing wall 3a of the water tank storing chamber or mounting chamber 3 as shown in FIG. 3. The liquid level display area 10 includes a liquid level meter 25 with labeled levels of the water and a liquid level display window or first transparent portion 10' made of the transparent or translucent material.

The water tank 5 is, for example, made of a transparent or translucent synthetic resin, and is formed in a box-like form, and is provided with a cap 15 having a water feed valve 14 at the end of the bottom wall of the water tank 5. Only a side wall or first transparent portion 6a and a bottom wall or second transparent portion 6b of the water tank 5 may be made of a transparent or translucent material, or otherwise transparent or translucent portions may be provided at the suitable positions of the side wall or first transparent portion 6a and the bottom wall second transparent portion 6b of the water tank 5, respectively.

A light source 7 is disposed under the water tank storing chamber or mounting means 3 for applying light into the water in the water tank 5 through the transparent or translucent portion of the bottom wall or second transparent portion 6b and the transparent plate or fourth transparent portion 13 to indicate the level of the liquid in the water tank 5 carried on the water tank storing chamber 3. The light source 7 is a lamp connected to a transformer 21, for example, a neon lamp, and is supported by a supporting plate 100. The light source 7 is faced with the transparent plate or fourth transparent portion 13 disposed at the bottom wall 11 of the water tank storing tank mounting chamber 3 and the transparent or translucent portion of the bottom wall 6b of the water tank 5.

When the light source 7 is turned on light, the light outputted from the light source 7 is applied to the water in the water tank 5 through the transparent plate or fourth transparent portion 13, and the transparent or translucent portion of the bottom wall or second transparent portion 6b. The incident light is introduced to an inclined surface 9 at the boundary between the inner surface 6c of the side wall or first transparent portion 6a and the surface 8 of the liquid caused by a surface tension of water. The incident light is reflected in the direction of the transparent of translucent portion of the side wall or first transparent portion 6a by the inclined surface of the water, and then the reflected light can pass through the transparent or translucent portion of the side wall or first transparent portion 6a so that the passing light is introduced to the outside through the transparent or translucent liquid level display window or third transparent portion 10'.

Under the light source 7, an L-shaped light transmission path 26 is provided for transmitting the light from the light source 7 to the outside of the humidifier 1. A driving signaling means 27 is disposed at the side wall 12 of the housing wall 3a of the water tank storing chamber or mounting means 3 for displaying a driving condition of the humidifier 1. When the humidifier 1 is driven, the driving signaling means 27 emitts light to the outside. The L-shaped light transmission path 26 is made of a transparent or translucent material such as glass or acrylic resin, and has a reflecting surface at the corner of the L-shaped light transmission path 26. One end of the L-shaped light transmission path 26 is connected to the driving signaling means 27 disposed at the side wall 12 of the housing wall 3a of the humidifier 1. When the humidifier 1 is driven, and the same time the light source 7 is turned on and emits light. The light outputted from the light source 7 is introduced into the inside of the water tank 5 and the L-shaped light transmission path 26. The light in the L-shaped light transmission path 26 is applied to the driving-indicator 27, so that the driving signaling means 27 emitts light.

A water supply portion 17 is provided at the front side of the bottom wall 11 of the water tank storing chamber or mounting means 3 and communicated with the atomizing chamber 2. The cap 15 is screwed to the water tank 5 and is placed in a condition that water in the water tank 5 is supplied to the water supply portion 17 when the water feed valve 14 is pressed.

A push pole 16 is projected from a bottom wall of the water supply portion 17 opposite the water feed valve 14 and presses the water feed valve 14 when the water tank 5 is stored in the water tank storing chamber 3. The atomizing chamber 2 is communicated with the water supply portion 17 so that the amount of the water in the atomizing chamber 2 always becomes constant. If the amount of the water in the chamber 2 becomes less than a predetermined amount, the water in the water tank 5 is supplied into the atomizing chamber 2 through the water supply portion 17 and the cap 15.

An ultrasonic vibrator 18 is disposed at the bottom wall of the atomizing chamber 2 for vibrating water in the atomizing chamber 2 and driven by a driver 19. The ultrasonic vibrator 18 is held by a heat radiating plate 18'. An atomizable high frequency voltage is applied to the ultrasonic vibrator 18 from the driver 19. When the ultrasonic vibrator 18 is driven by the driver 19, the water in the atomizing chamber 2 is vibrated and an ultrasonic water column 20 is formed on the surface of it. Therefore, the atomized water particles are produced from the surface of the ultrasonic water column 20. An air blower 24 is disposed under the water tank storing chamber or mounting means 3 for blowing air toward the ultrasonic water column 20 in the atomizing chamber 2. An air inlet cylinder 29 is upwardly extruded from or disposed on the bottom wall of the atomizing chamber 2 so as to introduce air blowed from the air blower 24 into the atomizing chamber 2. The atomizing chamber 2 is communicated with the outside through the air inlet cylinder 29 and an air inlet holes 30.

An atomizing cylinder 22 is integrally and downwardly provided on the upper wall of the atomizing chamber 2 to communicate the atomizing chamber 2 with the outside. The free end of the atomizing cylinder 22 is faced in the direction of the bottom wall of the atomizing chamber 2. The upper portion of the atomizing cylinder 22 is formed in a step of a setback form.

A blowoff member such as a blowoff cap 23 has an outlet 23' for dispersing atomized water particles into air. The blowoff cap 23 is inserted into the step portion of the atomizing cylinder 22 so that the side wall of the blowoff cap 22 is coupled with the horizontal wall and the vertical wall of the step portion of the atomizing cylinder 22. The lower section of the side wall of the blowoff cap 23 is closely in contact with the vertical wall of the step portion of the atomizing cylinder 22. In other words, the end of the side wall of the blowoff cap 15 is fixed by the horizontal wall of the step portion of the atomizing cylinder 22, and the side wall of the blowoff cap 23 is inwardly stressed by the vertical wall of the step portion of the atomizing cylinder 22 so that the blowoff cap 22 is rotatably and detachably provided at the upper portion of the atomizing cylinder 22.

Under the atomizing chamber 2 and the water tank storing chamber 3, the driver 19 for driving the ultrasonic vibrator 18, the air blower 24 for blowing air into the atomizing chamber 2 through the air inlet cylinder 29, and the transformer 21 are provided.

The operation of the humidifier 1 will be described below. When a start switch (not shown) of the humidifier 1 is set ON, the ultrasonic vibrator 18 is driven by the driver 19, and the same time the air blower 24 is driven by a motor. The ultrasonic water column 20 is formed on the surface of water in the atomizing chamber 2 and is covered by the atomizing cylinder 22. The air blowed by the air blower 24 is introduced into the atomizing chamber 2 through the air inlet cylinder 29, and after, forcibly discharged from the outlet 23' of the blowoff cap 23 through the atomizing cylinder 22. In this time, the atomized water particles produced from the surface of the ultrasonic water column 20 are dispered from the outlet 23' of the blowoff cap 23 with the air introduced from the air blower 24. Therefore, air of the outside is humidified.

In the above humidifier, when the humidifier 1 is driven and the light source 7 turns on, the light from the light source 7 is transmitted into the water tank 5 through the transparent or translucent plate 13 disposed at the hole formed in the bottom wall or second transparent portion 11 and the transparent or translucent portion of the bottom wall 6b, and then, passes though the water in the water tank 5. When the light is arrived at the surface of the water, the light is reflected by the inclined surface 9 at the boundary between the inside surface 6c of the side wall 6a and the surface of the liquid in the water tank 5 by the surface tention. The reflected light can pass through the transparent or translucent portion of the housing wall 3a, and then is refracted by the transparent or translucent portion of the side wall or third transparent portion 6a. Finally, the refracted light is introduced to the outside of the humidifier 1 through the transparent or translucent liquid level display window or third transparent portion 10', so that the level of the liquid in the water tank 5 is indicated by using light. The level of the outputted light is compared with the labels of the level meter 25 to thereby judge the level of the water in the water tank 5. In other words, the level of the water surface can be viewed from the outside.

The positions of the transparent portions of the bottom wall or second transparent portion 6b and 11, the side wall or first transparent portion 6a, and the side wall 12 of the housing wall 3a may be selectively arranged depending on the incident direction of the light outputted from the light source 7.

As described above, the water tank 5 is covered with the untransparent or untranslucent material except for the liquid level display portion. Therefore, the light from the surrounding or the direct light source is interrupted by the untransparent or untranslucent material, so that the water tank 5 is prevented from receiving the light from the outside. Therefore, the capability of the liquid level indication of the light source disposed in the device is greatly increased, and the liquid level can be displayed by the slight light.

The light source of the present invention can function as the light source of the driving condition display means and a light source of the level indicator.

The present invention should not be limited to the ultrasonic humidifier, and may be applied to another types of humidifiers such as a filter evaporating type, centrifugal atomizing type, and an electrothermal type. Further, the present invention may be applied to an electrical pot, an oil stove, a dehumidifier, or any other appliance.

In the present invention, although the water level in the water tank is displayed, the present invention is applied to liquid which can transmsitt the light.

The housing wall 3a may be detached from the body of the humidifier 1 together with the cover 4 as far as the detached wall has the liquid level display window through which the level of the water can be observed.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A liquid level indicator for a humidifier comprising:
    a liquid storing tank for storing liquid therein containing a first transparent portion and a second transparent portion;
    mounting means for detachably mounting said liquid storing tank therein containing a third transparent portion and a fourth transparent portion;
    non-transparent covering means being detachable from the humidifier above said liquid storing tank within said mounting means; and
    light source means for emitting light into the liquid tank means through said fourth transparent portion of said mounting means and said second transparent portion of the liquid storing tank, wherein the light emitted from the light source means is reflected in the direction of the first transparent portion of the liquid storing tank by the inclined surface of liquid produced by the surface tension of the liquid at the side wall of the liquid storing tank, said light being deflected at the surface of the liquid level to pass through the first transparent portion of the liquid storing tank and the third transparent portion of the mounting means whereby the level of the liquid can be measured through said first transparent portion from outside the liquid storage tank.

2. The liquid level indicator of claim 1, wherein the light source is positioned to direct its light along the wall of the liquid storing tank whereby the light is deflected at the inclined surface produced when the liquid level contacts the inside surface of the liquid storing tank.

3. The liquid level indicator of claim 1, wherein the first transparent portion of the liquid storing tank is faced with the third transparent portion of the mounting means.

4. The liquid level indicator of claim 1, wherein the second transparent portion of the liquid storing tank is faced with the fourth transparent portion of the mounting means.

5. The liquid level indicator of claim 1, wherein the light from the light source means is also directed to a driving signaling means for indicating when the liquid level indicator is operative.

6. The liquid level indicator of claim 5, wherein the light source produces a light transmission path from the light source to the driving signaling means.

7. The liquid level indicator of claim 5, wherein the liquid storing tank is a humidifier and when the humidifier is turned on the light source means is turned on.

8. The liquid level indicator of claim 1, wherein the second transparent portion is in the bottom of the liquid storing tank and said fourth transparent portion is adjacent said second transparent portion whereby the light emanating from the light source traverses the height of the liquid in the liquid storing tank to the surface thereof before being deflected to pass through said first and third transparent portions.

9. A liquid level indicator for a humidifier comprising:
- a liquid storing tank for storing liquid therein containing a first transparent portion and a second transparent portion;
- mounting means for detachably mounting the liquid storing tank thereon containing a fourth transparent portion;
- covering means for covering said liquid storing tank containing a third transparent portion; and
- light source means for emitting light into said liquid tank means through the fourth transparent portion of said mounting means and said second transparent portion of said liquid storing tank, wherein the light emitted from the light source means is reflected in the direction of the first transparent portion of the liquid storing tank by the inclined surface of liquid produced by the surface tension of the liquid at the side wall of the liquid storing tank, said light being deflected at the surface of the liquid level to pass through said first transparent portion of said liquid storing tank and said third transparent portion of the covering means whereby the level of the liquid can be measured through said first transparent portion from outside the liquid storage tank.

10. A liquid level indicator for a humidifier comprising:
- a liquid storing tank for storing liquid therein containing a first transparent portion and a second transparent portion;
- mounting means for detachably mounting said liquid storing tank therein containing a fourth transparent portion;
- housing wall means provided on said mounting means for storing said liquid tank containing a third transparent portion; covering means for covering said liquid storing tank detachably connected to said housing wall means; and
- light source means for emitting light into said liquid tank through said fourth transparent portion of the mounting means and said second transparent portion of the liquid storing tank, wherein the light emitted from the light source means is reflected in the direction of the first transparent portion of the liquid storing tank by the inclined surface of liquid produced by the surface tension of the liquid at the side wall of the liquid storing tank, said light being deflected at the surface of the liquid level to pass through said first transparent portion of said liquid storing tank and said third transparent portion of said housing wall means whereby the level of the liquid can be measured through said first transparent portion from outside the liquid storing tank.

* * * * *